(No Model.) 10 Sheets—Sheet 1.
F. H. GILBERT.
VOTING MACHINE.
No. 551,185. Patented Dec. 10, 1895.
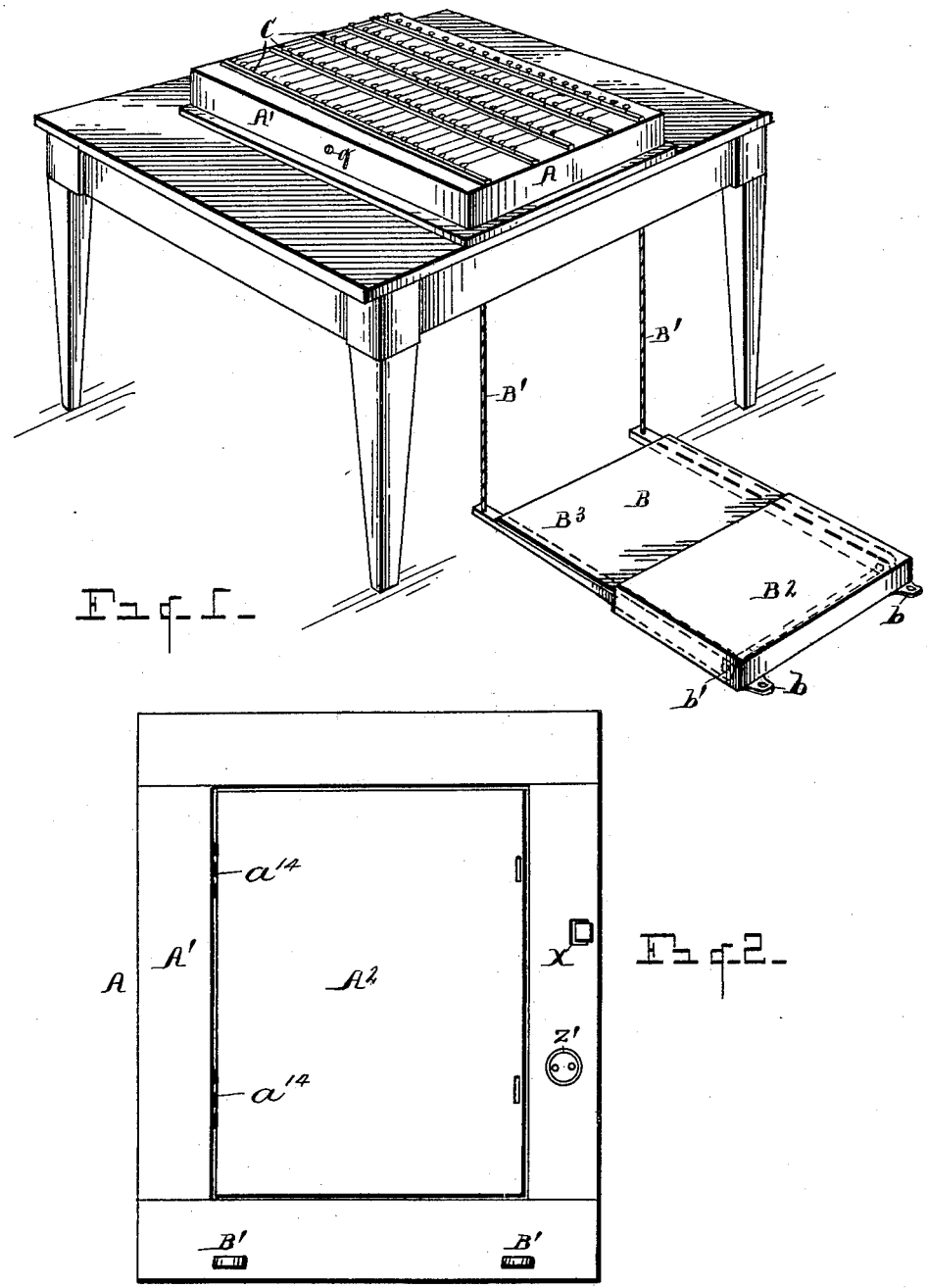

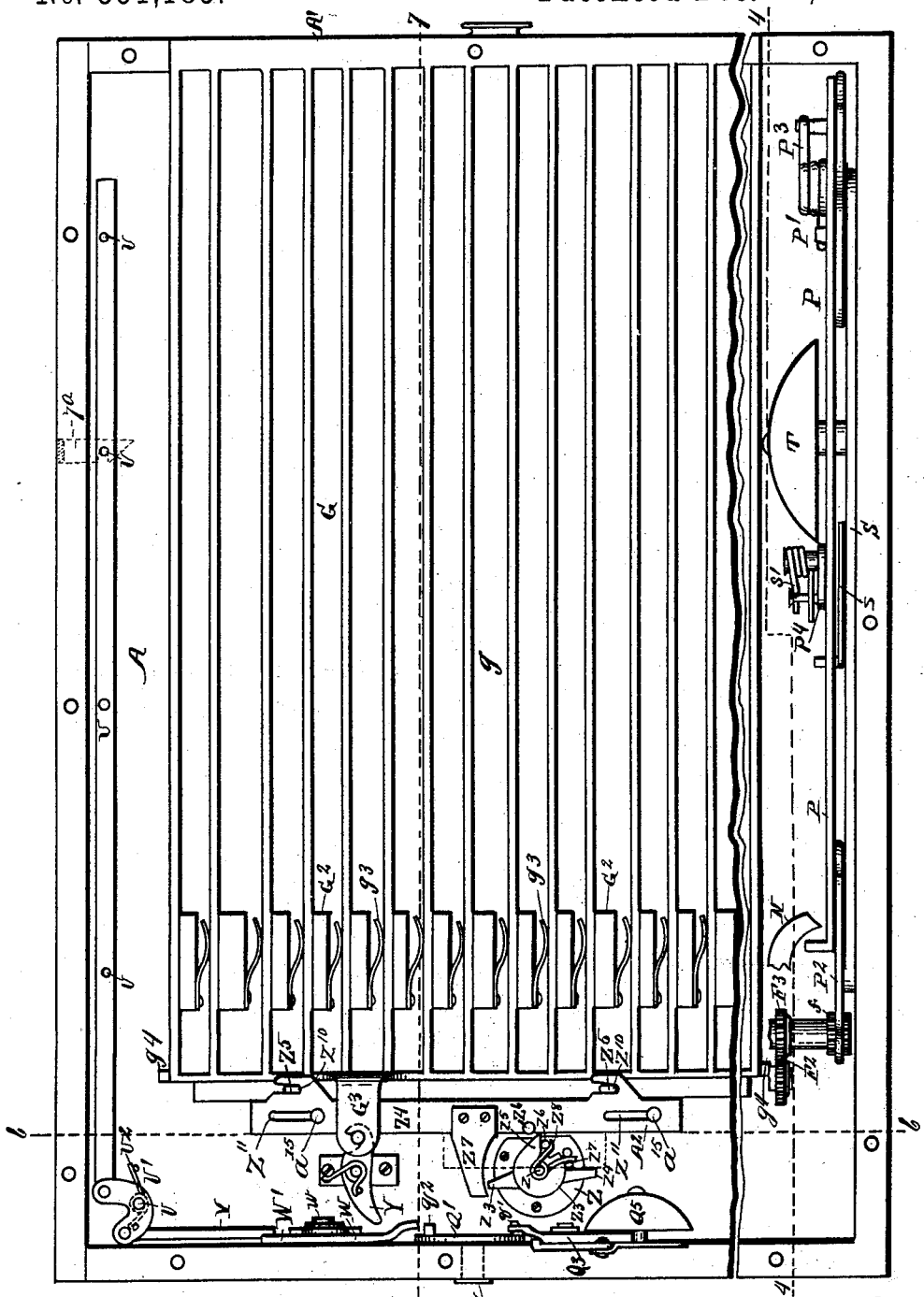

(No Model.)  10 Sheets—Sheet 3.
F. H. GILBERT.
VOTING MACHINE.
No. 551,185. Patented Dec. 10, 1895.
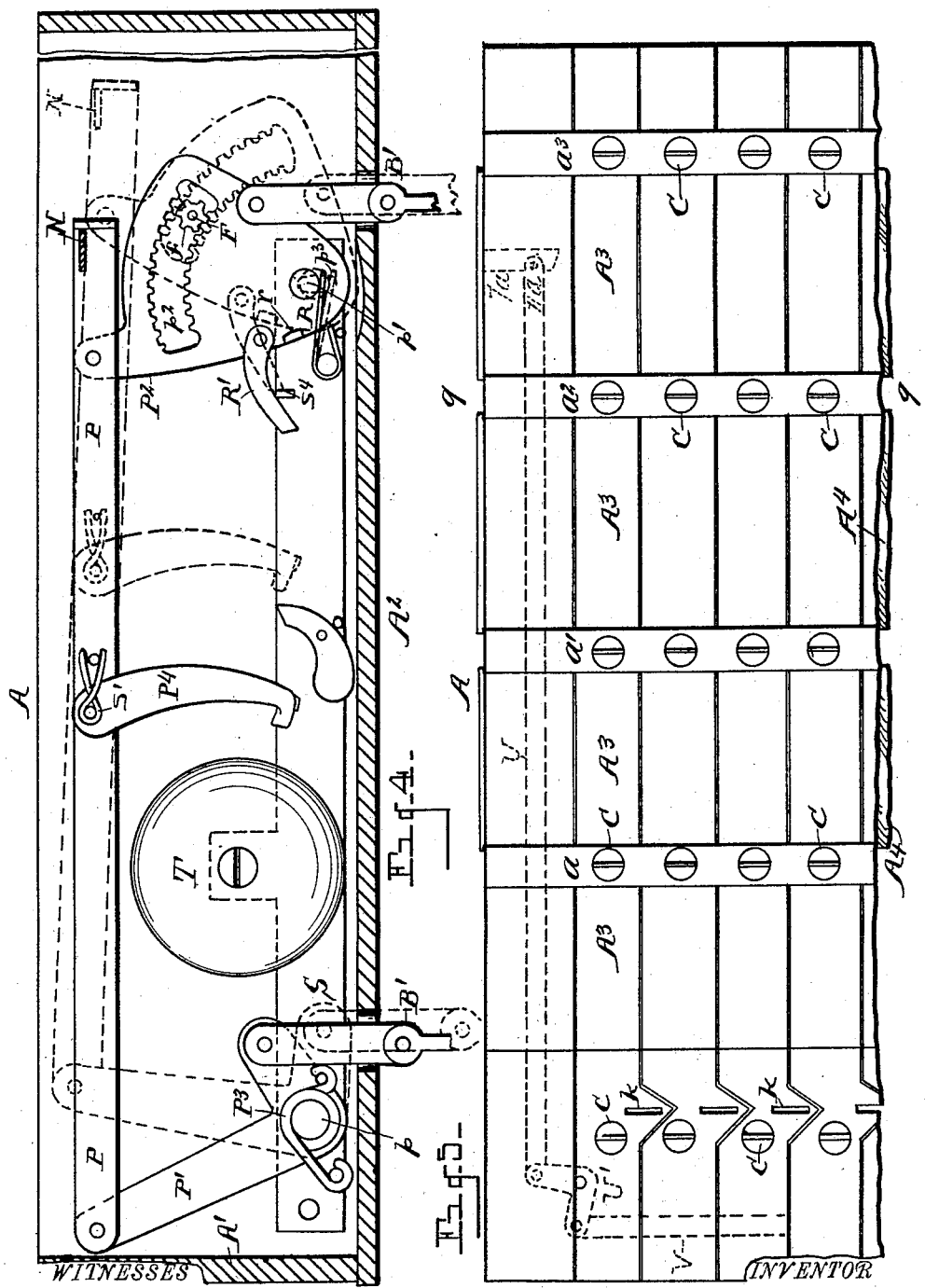
WITNESSES
O. B. Baenziger
M. A. Martin
INVENTOR
Frank H. Gilbert
By his Attorney
Newell S. Wright

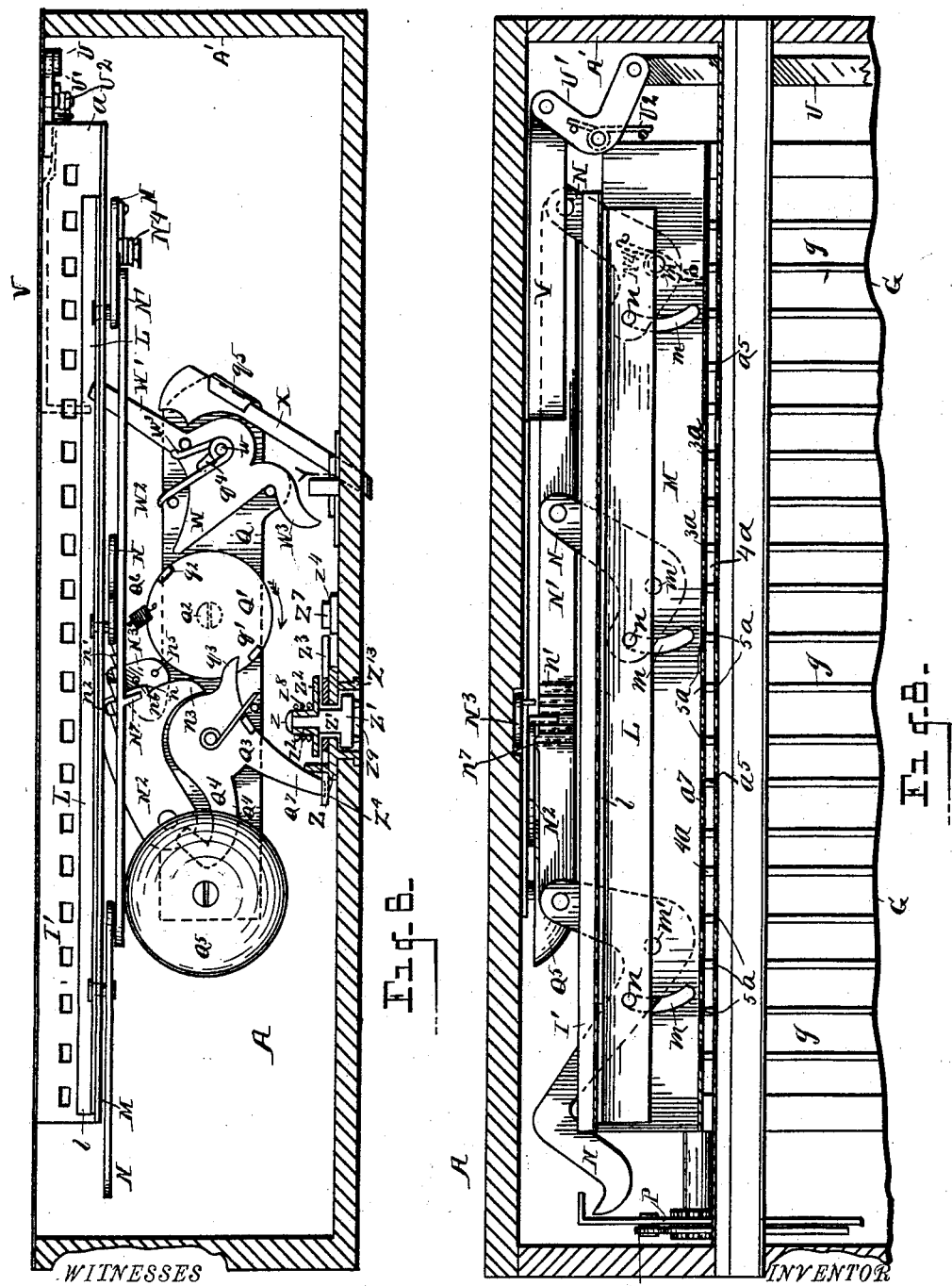

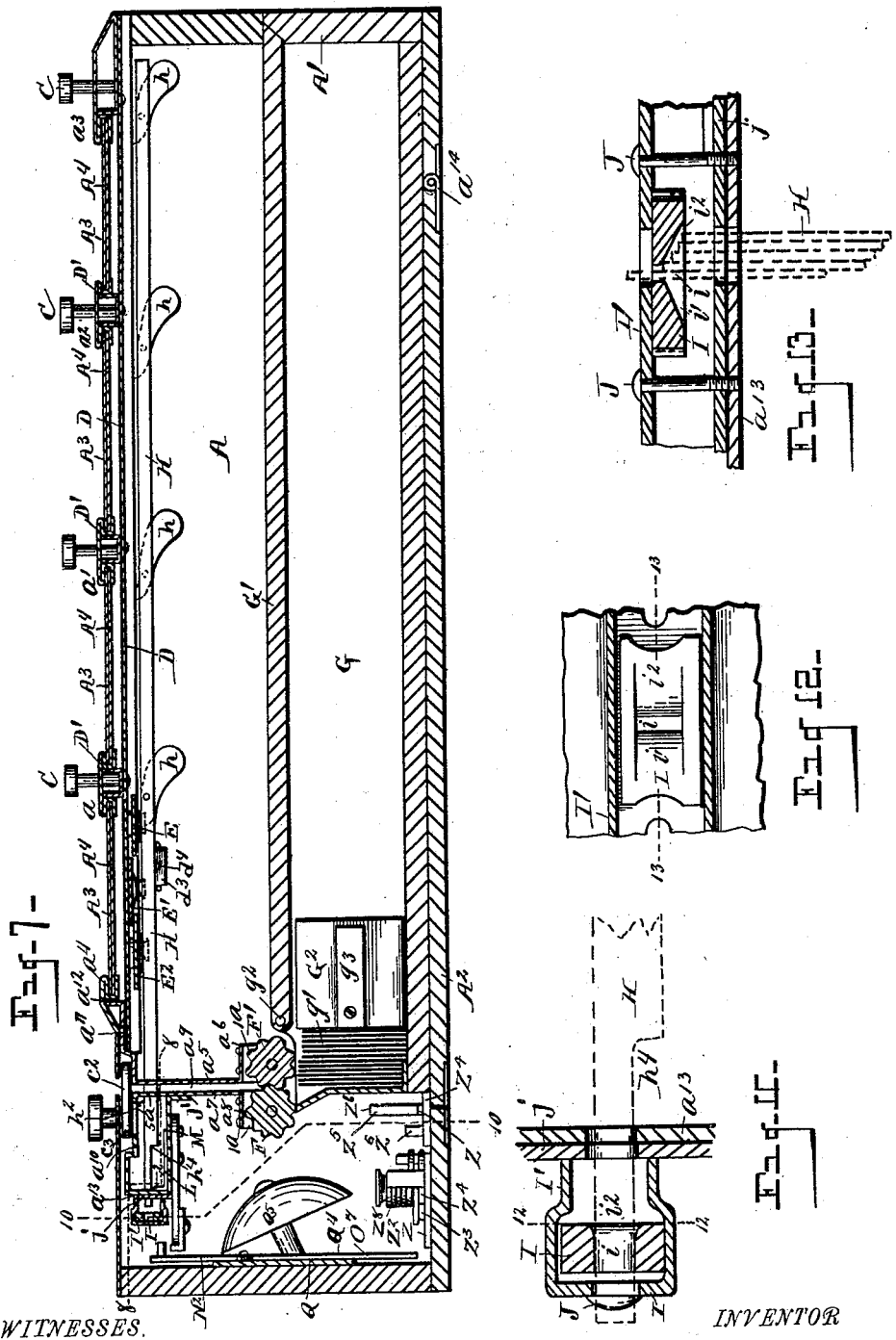

(No Model.) 10 Sheets—Sheet 6.
F. H. GILBERT.
VOTING MACHINE.
No. 551,185. Patented Dec. 10, 1895.
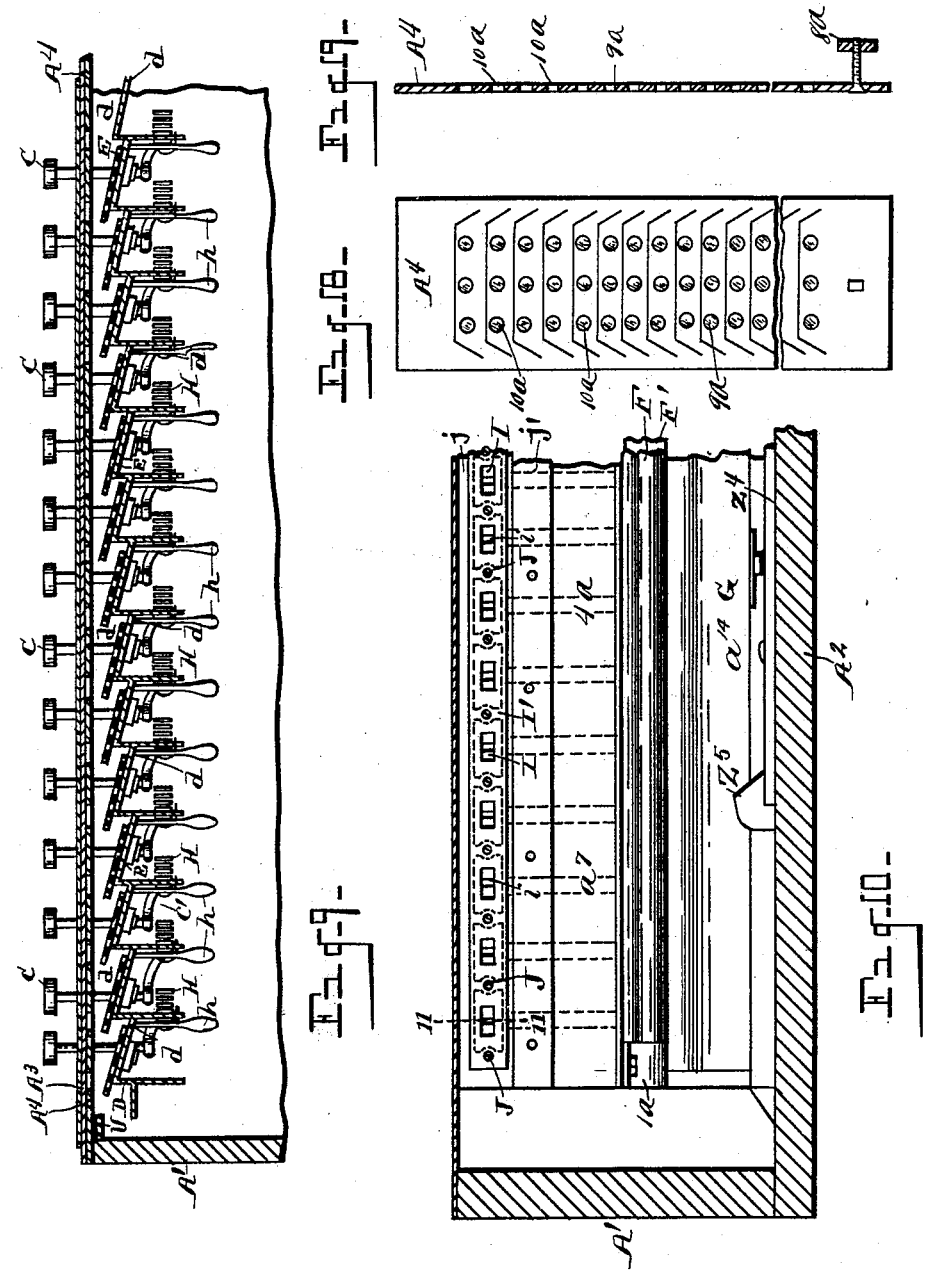
WITNESSES
Otto B. Baenziger
M. A. Martin
INVENTOR
Frank H. Gilbert
By H ? S Attorney
Newell S. Wright (No Model.) 10 Sheets—Sheet 7.
F. H. GILBERT.
VOTING MACHINE.
No. 551,185. Patented Dec. 10, 1895.
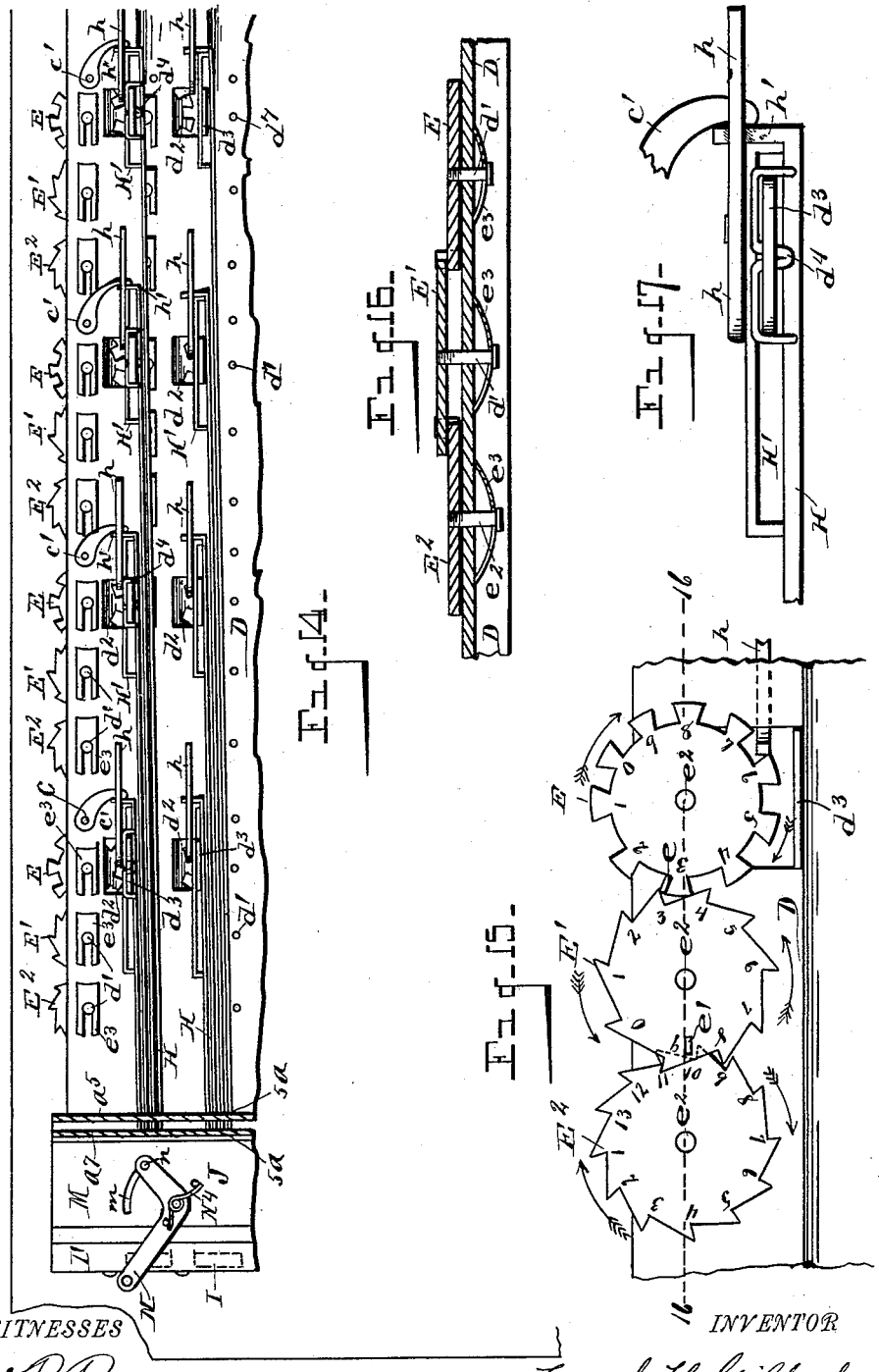
WITNESSES
INVENTOR
Frank H. Gilbert
By His Attorney
Newell S. Wright (No Model.) 10 Sheets—Sheet 8.
F. H. GILBERT.
VOTING MACHINE.
No. 551,185. Patented Dec. 10, 1895.
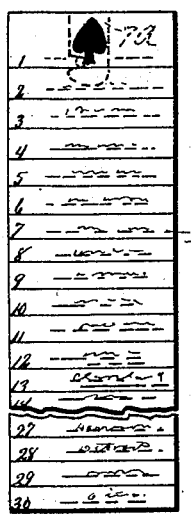
Fig. 20.
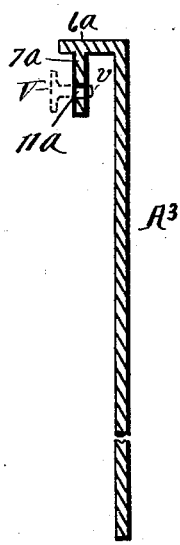
Fig. 21.
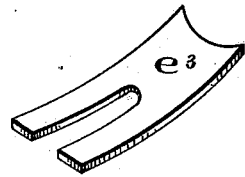
Fig. 24.
Fig. 27.
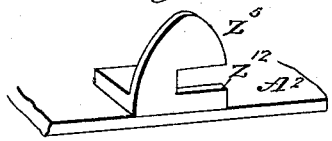
Fig. 25.
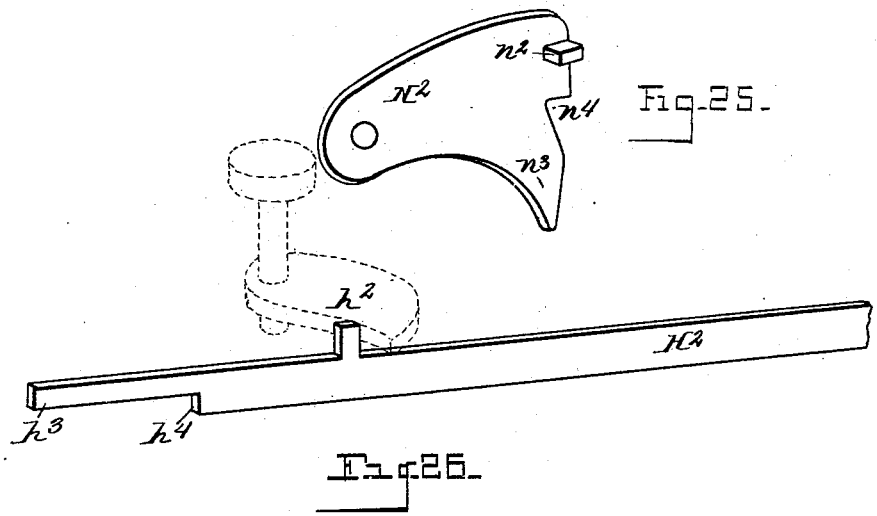
Fig. 26.
WITNESSES
Otto B. Baenziger
M. O. Martin
INVENTOR
Frank H. Gilbert
By His Attorney
Newell S. Wright (No Model.)   10 Sheets—Sheet 9.

F. H. GILBERT.
VOTING MACHINE.

No. 551,185.   Patented Dec. 10, 1895.

WITNESSES  
Otto B. Baenziger  
M. A. Martin

INVENTOR  
Frank H. Gilbert  
By His Attorney  
Newell S. Wright (No Model.)
F. H. GILBERT.
VOTING MACHINE.
No. 551,185. Patented Dec. 10, 1895.
10 Sheets—Sheet 10.
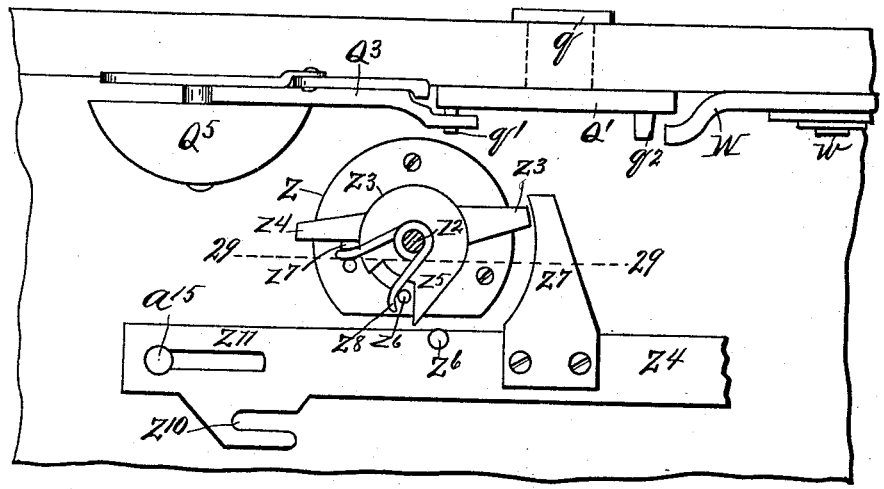
Fig. 28.
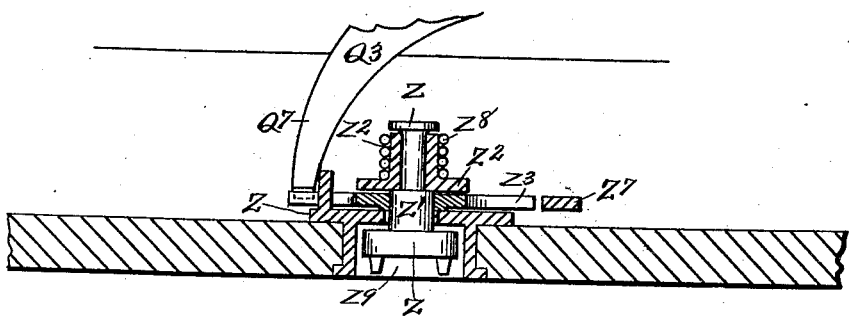
Fig. 29.
Fig. 30.
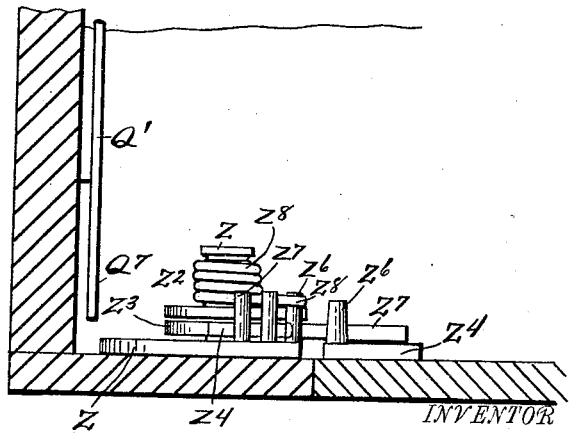
WITNESSES
O. B. Baenziger,
M. A. Martin.
INVENTOR
Frank H. Gilbert
By his Attorney
Newell S. Wright.

UNITED STATES PATENT OFFICE.

FRANK H. GILBERT, OF RIDGEFIELD, WASHINGTON.

VOTING-MACHINE.

SPECIFICATION forming part of Letters Patent No. 551,185, dated December 10, 1895.

Application filed December 24, 1894. Serial No. 532,797. (No model.)

*To all whom it may concern:*

Be it known that I, FRANK H. GILBERT, a citizen of the United States, residing at Ridgefield, county of Clarke, State of Washington, have invented a certain new and useful Improvement in Voting-Machines; and I declare the following to be a full, clear, and exact description of the invention, such as will enable others skilled in the art to which it appertains to make and use the same, reference being had to the accompanying drawings, which form a part of this specification.

My invention pertains to a voting-machine of novel construction, hereinafter specified and claimed, and illustrated in the accompanying drawings, in which—

Figure 22:
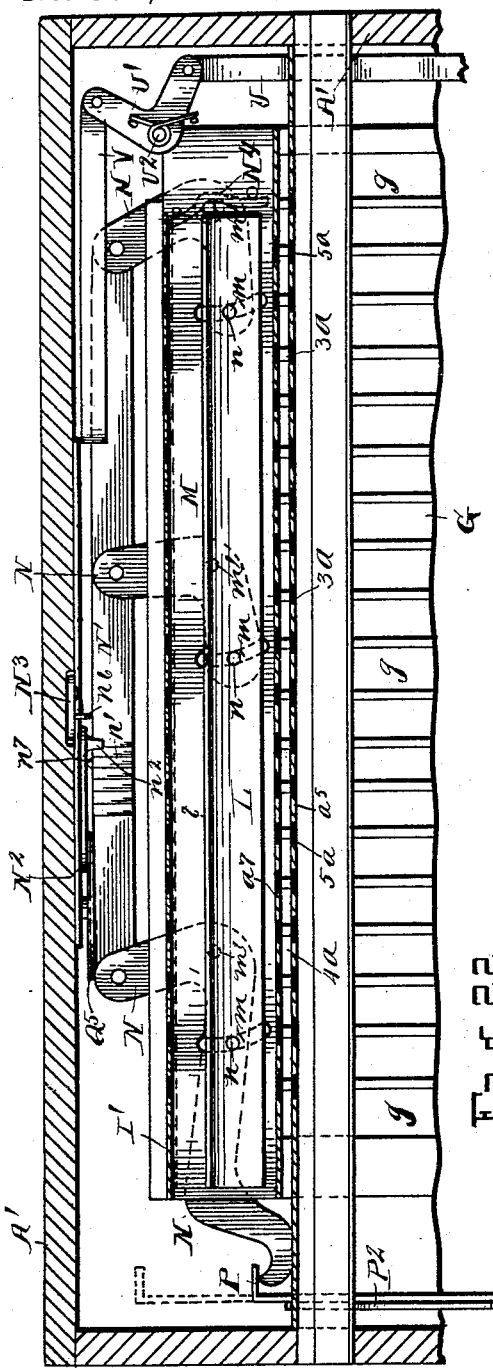
Figure 23:
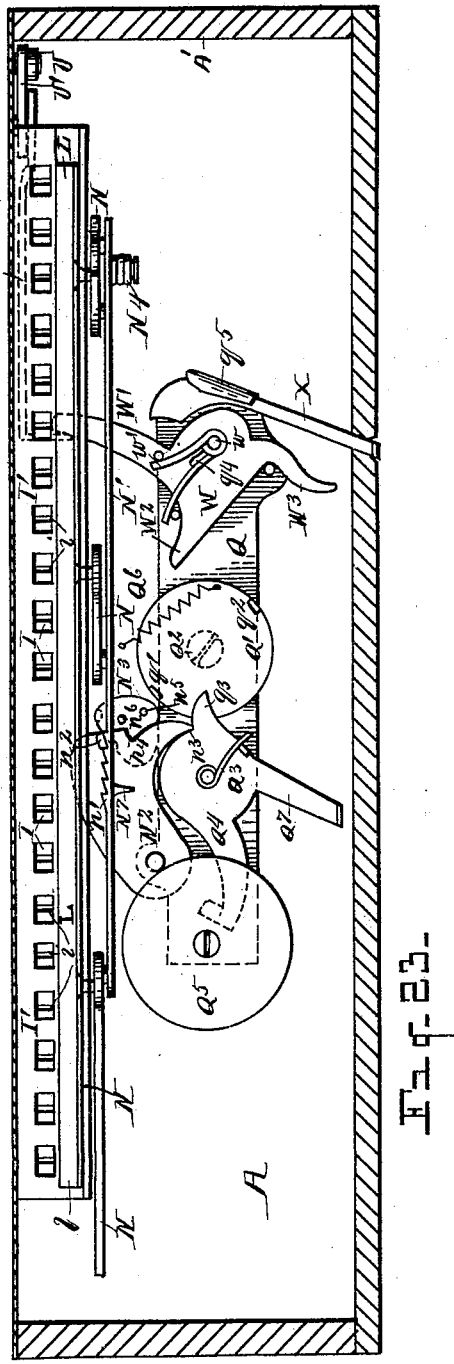

Figure 1 is a view in perspective showing my machine in place ready for use. Fig. 2 is an inverted plan of the register. Fig. 3 is a plan view with the top of the register removed. Fig. 4 is a vertical cross-section on the line 4 4, Fig. 3. Fig. 5 is an enlarged view of a portion of the top of the register. Fig. 6 is a section on the line 6 6, Fig. 3. Fig. 7 is a vertical section on the line 7 7, Fig. 3. Fig. 8 is a partial horizontal section on the line 8 8, Fig. 7, showing the mechanism in position to vote. Fig. 9 is a partial vertical section through the top of the register on the line 9 9, Fig. 5. Fig. 10 is a partial vertical section on the line 10 10, Fig. 7, looking toward the coupon-drawer of the machine. Fig. 11 is a detail view on the line 11 11, Fig. 10, through one of the perforated blocks. Fig. 12 is a detail view in section on the line 12 12, Fig. 11. Fig. 13 is a detail view in section on the line 13 13, Fig. 12. Fig. 14 is an inverted plan of a portion of the cover of the register with devices thereto attached. Fig. 15 is a detail view of a set of registering-wheels. Fig. 16 is a view of said registering-wheels in side elevation, showing parts in section. Fig. 17 is a detail view of one end of one of the sliding bars. Fig. 18 is a plan view of one of the cover-plates. Fig. 19 is a longitudinal section through said cover-plate. Fig. 20 is a plan view of one of the cover-slides. Fig. 21 is a longitudinal section of said slide. Fig. 22 is a view similar to Fig. 8, but showing the mechanism in locked position. Fig. 23 is a view similar to Fig. 6, but showing the mechanism in the position assumed when actuated by the key. Fig. 24 is a detail view of one of the springs $e^3$. Fig. 25 is a detail view of the pawl $N^2$. Fig. 26 is a detail view of one of the rods $H^2$. Fig. 27 is a detail view illustrating the construction of the locking-lugs $Z^5$. Fig. 28 is an enlarged view of the locking mechanism shown in Fig. 3. Fig. 29 is an enlarged view of the locking mechanism shown in Fig. 6. Fig. 30 is an enlarged view of said mechanism shown in Fig. 7.

The object of my invention is to provide a voting-machine to register the votes at an election; and it consists, essentially, of a register adapted to be placed upon a table, a platform being suspended therefrom, upon which the voters stand while voting, the weight of the voter depressing the platform, and thereby enabling him to operate the voting-keys and record his vote.

My invention contemplates the automatic locking of the register when said platform is not depressed, as when the voter steps off therefrom, and other means whereby it will be impossible for a voter to cast more than a single vote for a given candidate and whereby it will also be impossible for a voter to vote for more than one candidate for a particular office. The register is provided with voting-keys preferably arranged in horizontal lines and vertical columns, as indicated in the accompanying drawings, providing for different political parties and for different offices in each party.

My invention further contemplates a construction which will enable a straight ticket to be voted or by which a person wishing to "scratch his ticket" can do so as he may desire.

My invention is designed also to provide a voting-machine which is placed in a private room or booth and which will permit the voter while on the platform to readily see what key he has manipulated; but when he steps off the platform all keys will be returned to normal position, so that no person can tell what votes he has cast. When a voter steps off the platform a bell is sounded, and should he step back upon the platform again he would be unable to vote, the machine being automatically locked, permitting no further voting until a judge or inspector of elections or other official unlocks the register again. The mechanism of the machine is so arranged that while the voting is going on no one can tell the results until after the poll is closed. By unlocking certain parts of the machine the results can be quickly read off by means of suitable registering-wheels, but still without the possibility of getting at the record to change the results fraudulently without detection.

Each vote is recorded by a units-wheel belonging to a set of registering-wheels whereby every vote cast for a given candidate is added to those previously cast for the same candidate.

My invention thus is designed to afford the greatest facility in voting and to prevent the liability of corrupt or fraudulent voting or counting of votes.

I carry out my invention as follows:

In the drawings, A denotes a register. (Shown resting upon a table.)

B denotes a platform suspended from the register by means of chains or other suitable connections B', upon which platform the voter is to stand in the operation of voting.

A' denotes the case of the register. $A^2$ is the bottom thereof.

C denotes a series of voting-keys to be manipulated by the voter. In Figs. 1 and 5 these keys are shown arranged in five vertical columns or rows, which I term the "party rows." The keys are also arranged in a series of horizontal rows. Fig. 1 shows twenty such horizontal rows, which I call the "office rows." The vertical rows of keys are arranged for the different political parties and the horizontal rows are arranged for the different offices in the parties. Thus, for example, the second vertical row from the left of the machine (shown in Fig. 1) might be designated the "Democratic party" row; the third, the "Republican party" row; the fourth, the "Populist party" row; the fifth, the "Prohibition party" row. The first vertical row I contemplate to be used for "scratching" a ticket to enable a voter to deposit a vote for any given candidate not upon any party ticket, as hereinafter described.

While I have shown thus five vertical rows of voting-keys and twenty horizontal rows, I would have it understood that I do not limit myself to any particular number of party rows or office rows, inasmuch as any desired number of party rows and office rows may be employed within the scope of my invention.

In the space between the vertical rows a printed party ticket might be pasted, as to the left of the keys for that given party, so that a voter looking to a given party ticket would manipulate the key at the right thereof in voting for said ticket.

Toward the top of the register is located a creased or stepped plate D, preferably made of sheet metal, rigidly joined to which are three intermediate grooved supports $a$, $a'$, and $a^2$, Fig. 7, which may be formed of sheet metal bent to form grooves at their lateral edges, as shown. An additional outside support $a^3$ is located at the right hand of the register, formed with a groove at is inner edge. At the left hand of the register is an additional grooved support $a^4$ formed with grooves on one of its lateral edges, as indicated. Between said supports I locate a series of cover-plates $A^3$, upon which the party tickets may be pasted, and beneath which are a series of observation-plates $A^4$. The grooved supports at their edges embrace the edges of said plates, as shown.

The stepped plate D is engaged with the grooved supports $a$ $a'$ $a^2$ $a^3$ by intermediate metal ribs D', to which the stepped plate may be riveted or otherwise secured. The support $a^3$ at the right hand is preferably brought over and underneath its corresponding rib to finish the outer edge of the register at that point. The metal support $a^4$ is preferably constructed of a piece of bent sheet metal flanged, as shown, to embrace the edge of the adjacent plates $A^3$ and $A^4$ at the right thereof. A vertical wall $a^5$, provided with a lateral flange $a^{11}$ at its upper end, is joined to the right-hand portion of the support $a^4$, said upper flange of the wall $a^5$ being preferably soldered to the flanged portion of the support $a^4$, as at $a^{12}$. The wall $a^5$ is also flanged laterally at its lower end, as shown at $a^6$. Adjacent to the wall $a^5$ is located a corresponding wall $a^7$ flanged laterally at its base, as at $a^8$, forming between it and the wall $a^5$ a vertical slot $a^9$. At its upper end the wall $a^7$ is bent laterally, as shown at $a^{10}$.

The stepped plate D is constructed with a series of inclined steps $d$, each step of which is pierced by a series of holes at $d^7$, preferably arranged laterally in four sets of four holes in each set, three holes of each set being for the axes of the adding or registering wheels, and the hole at the right of each set being for the shank of the corresponding voting-key, as shown in Figs. 14, 15, and 16.

E, E', and $E^2$ denote the members of a set of adding or registering wheels, there being one set of said wheels corresponding to each key, the wheel E being a units-wheel, the wheel E' registering the tens, and the wheel $E^2$ registering the hundreds in a manner common in a set of registering-wheels.

The units-wheel of each set is arranged to be rotated one unit by each operation of the corresponding voting-key. A spur $e$ upon the units-wheel rotates the wheel E' one notch upon every revolution of the wheel E. So, likewise, a spur $e'$ upon the wheel E' moves the wheel $E^2$ one notch upon every complete revolution of the wheel E'. The wheels E and E' are each mounted upon an axis $d'$, and a wheel $E^2$ upon an axis $e^2$. Upon the lower end of the axis of each registering-wheel I prefer to locate a spring $e^3$ to hold the corresponding wheel snugly in position.

At one side of the axis of each units-wheel an opening $d^2$ is formed in the stepped plate D, said opening being preferably formed by cutting through the corresponding step of the plate on three sides thereof and turning down a flap $d^3$, as shown, for example, in Figs. 14 and 17. The teeth on the periphery of the units-wheel are exposed through said opening $d^2$, as indicated in Fig. 14. The grooved supports $a\ a'\ a^2\ a^3$ are preferably soldered to the metal rib D', said rib being preferably made of U-shaped metal. Said supports and said ribs are both pierced, respectively, for the shafts of the voting-keys, which pass vertically down thereunder and through the corresponding orifices in the stepped plate D below. The vertical slot $a^9$ I term the "voting-card passage." The left-hand portion of the flange $a^{10}$ is preferably bent downward, as indicated at $a^{13}$. The flanges $a^6$ and $a^8$ at the base of the walls $a^5$ and $a^7$ project horizontally in opposite directions. To said horizontal flanges are joined bearings $1^a$, for the journal of the two fluted rollers F F', meshing one with another beneath the lower end of the orifice $a^9$. Between the vertical walls $a^5$ and $a^7$ are located a series of parting-strips $3^a$, separating the orifice $a^9$ into a series of voting-card passages $4^a$, said parting-strips being shown in Figs. 8 and 22 and in dotted lines in Fig. 10.

At the base of the register-case is located a drawer G, divided into a series of apartments $g$ to receive the voting-cards or coupons $g'$ when the voter votes for a candidate not on the party list. G' is a cover of the drawer, the said cover being preferably hinged at its inner edge, as shown at $g^2$, to prevent its being opened until the drawer is pulled fully out of the case. The inner ends of the apartments $g$ are uncovered and projected, as shown, underneath the fluted rollers F F', whereby the card or coupon $g'$ deposited into one of the voting-card passages $4^a$ will be carried by the rotation of the fluted rollers into the corresponding apartment of the drawer. In each of said apartments I locate a follower $G^2$, provided with a friction-spring $g^3$, having just sufficient tension to hold the follower snugly against the coupons deposited into the apartment and yet allow the follower to be pressed back to permit the deposit of additional coupons into the apartment. Toward the upper edges of the walls $a^5$ and $a^7$ and over the ends of the parting-strips $3^a$, between the voting-card passages $4^a$, said walls are provided with openings therethrough, (indicated at $5^a$,) as shown in Figs. 7, 8, 14, and 22.

H denotes a sliding rod or bar projecting through said openings $5^a$, as indicated in Fig. 7, and provided with a pawl $h$ to engage the units-wheel, a number of such rods H being located in the register corresponding to the number of voting-keys. The rods H pass through the openings $5^a$ in the walls $a^5$ and $a^7$. These sliding rods are arranged in series, the number in a series equaling the number of party voting-keys. Thus, for illustration, in the example shown, where there are five party or vertical columns of voting-keys, there would be five sliding rods H in each series, there being as many series as there are horizontal rows or "office-keys." Each of the sliding rods H is provided with a loop H', Figs. 14 and 17, formed in any suitable manner, embracing the corresponding flap $d^3$ of the stepped plate D. The flaps $d^3$ are provided with a key $d^4$ to hold the rod H in engagement therewith, the ends of the key $d^4$ having a spring-tension upon the rod H.

It will be evident that the flap serves as a stop to limit the movement of the rod H, inasmuch as the extremities of the loop H' will strike the flap as the rod is moved in either direction. The end of the rod H adjacent to said loop is provided with a flange $h'$.

The shank $c$ of each of the voting-keys is provided with a dog $c'$, which, when the corresponding key is rotated, strikes against the flange $h'$ of the sliding rod H and throws said rod in a corresponding direction. The pawl $h$ of the sliding rod is thus moved into engagement with the corresponding units-wheel, whereby the wheel is rotated one unit or one notch. This style of sliding rod—viz., the rod H—is used in connection with each of the voting-keys in the four vertical columns at the right hand of the register, and each of said voting-keys when manipulated actuates a corresponding sliding rod in the manner above described. The pawls $h$ are preferably gravity-pawls. At one side of the register I locate a series of perforated blocks I, Figs. 7, 11, 12, 13, and 23, held in place in a suitable housing I', the individual blocks I having a limited sliding movement. Each of said blocks is constructed with a perforation $i$ having beveled approaches $i'\ i^2$. The perforation $i$ is constructed to admit the end of one sliding bar H only at a time, as the sliding bar is thrown by the corresponding key. My invention contemplates the provision of one of these blocks I for each set of sliding bars H, and obviously when the end of one of said bars is entered into the perforation $i$ no other bar of the series can be manipulated, inasmuch as if any other bar of the series is attempted to be thrown its movement will be prevented by the end of the bar striking against the face of the block I and the possibility of its being thrown into the perforation $i$. Consequently said bar cannot be thrown far enough to engage its pawl $h$ with the units-wheel. In this manner only one candidate for a given office can be voted for.

Each step $d$ of the plate D corresponds, it will be seen, with the office row of the voting-keys.

To the wall $a^7$ I attach a plate M, Fig. 7, provided with an upturned flange $j$. The housing I' may be attached to the flange $a^{13}$ of the wall $a^7$ by screws J passing from the outside of the housing inward through the upturned flange $j$. The lower end of the plate M is provided with a flange $j'$, attached to the wall $a^7$.

The voting-keys in the left-hand column of the register pass through the plate $a^4$, said plate being also provided with orifices $k$ corresponding to the voting-card passages $4^a$. Above the card-passages $4^a$ engaged with the voting-keys of the left-hand vertical row of the register are a series of arms $c^2$, which cover the card-passages when in normal position, and which are turned out of the way by the turning of the corresponding key, so as to permit the insertion of a card or coupon into the passage $4^a$ therebeneath. These arms also engage a sliding rod $H^2$ within the register, said rod being provided with an ear $h^2$ projecting upward into the space occupied by the cover-arms $c^2$, through suitable slots $c^3$ above said ear in the flange $a^{10}$. The sliding rod $H^2$ belongs to the various series of sliding rods heretofore referred to, and when operated the end of the rod enters the perforation $i$ in the adjacent block I.

The upper plate $A^3$ is flanged downward at one end, as shown at $6^a$, from which flange is an inwardly-extended fastening-piece $7^a$ parallel to the plate.

The lower plate $A^4$ is fastened in place by means of a thumb-screw $8^a$, which can only be reached from within the register, the head of the thumb-screw being underneath the slide. This latter plate is provided with openings $9^a$ over the registering-wheels, said openings being covered with glass, as indicated at $10^a$, through which the records can be read upon the registering-wheels.

The numerals of the office-keys are placed consecutively on each of the upper plates and at the left-hand vertical row of keys from the top to the base of the register, as indicated. The lower plate $A^4$ is also provided with numerals placed to correspond with the numerals on the upper slide, the lower plate being preferably divided laterally into a series of spaces upon which the numerals are placed. Each party column may be distinguished in any suitable manner in addition to the ticket placed upon the upper plate, as by different colors or by a designated device at the head of the column—as, for instance, by a club, heart, spade, and diamond. The base $A^2$ of the case is removable; but it, together with the various features at the top of the register-case hereinbefore described, are secured in place in such a manner and by such means that they cannot be removed from the outside of the register-case except by first unlocking certain controlling parts of the mechanism, as will be hereinafter explained.

The drawer G is of a width sufficient to receive coupons from the whole line of office-keys and is provided with stops $g^4$ or other means to prevent the drawer from being pulled fully out, thereby preventing any communication or access to the inside mechanism of the register when the drawer is open.

The various sliding rods H and $H^2$ are made of different lengths, there being one for each voting-key, and they are each recessed at one end, as shown at $h^3$, and provided with a shoulder, as at $h^4$, toward the end adjacent to the perforated blocks I. The rods H may all be alike, except as to length. The rods $H^2$ are constructed and operated essentially upon the same principle, although the construction and arrangement differ in the details heretofore mentioned. Each key is preferably marked upon its top with the same distinguishing device as is used to denote a given party column. They are preferably marked with a line across their face, as shown, to indicate to the voter what keys have been operated. At one side within the register is located mechanism for returning the sliding rods H and $H^2$ to their normal position. It is obvious that said rods are not returned to normal position by the operation of the voting-keys, inasmuch as their construction and arrangement only permit their moving the sliding rods in one direction. The mechanism for returning said rods consists of a returning-slide L, Figs. 7, 22, and 23, formed with a flange $l$, lying underneath the whole series of sliding rods H and $H^2$, its flange $l$ projecting across at right angles to the sliding rods within the recesses $h^3$ to bear against the shoulders $h^4$ and force the slides back into normal position. The returning-slide L rests upon the underlying angle-plate M, provided with elongated curved slots $m$. N denotes a series of bell-cranks fulcrumed to the plate M, as shown at $m'$, said bell-cranks being united by a connecting-bar $N'$. Each of said bell-cranks is provided with a crank-pin $n$, projecting through the adjacent slot $m$ on the plate M and connected with the returning-slide L.

It will be seen that a movement of the bell-cranks will reciprocate the returning-slide L and bring its flange $l$ into contact with the shoulders $h^4$ of any and all of the sliding rods H and $H^2$ which have been manipulated by their corresponding keys, and thereby move said rods back into position for another operation. The bell-cranks N are operated in one direction by means of a sliding hooked bar P, which engages the arm of a bell-crank N adjacent thereto. A bell-crank $P'$ is fulcrumed, as at $p$, on the side of the case and connected with said hooked bar at one side thereof. The other end of said bell-crank is united to one of the connections $B'$ leading to the platform B. At the opposite end of the bar P is engaged a bell-crank lever $P^2$, fulcrumed to the case, as at $p'$, and with which the other connection $B'$ of the platform B is united. The bell-crank lever $P^2$ is constructed with a toothed cam-slot $p^2$, preferably toothed upon its opposite edges, as shown. Into this cam-slot one end of the fluted roller F projects.

It will be obvious by reference to Fig. 4 that a person standing upon the platform B, through the intervention of the connections $B'$, will throw the bell-cranks $P'$ and $P^2$ into the position shown in said figure in dotted lines, thereby bringing the teeth on the upper edge of the slot into engagement with the roller-pinion, by which operation the bar P will also be advanced, as indicated in dotted lines. When the voter steps from the platform the bell-cranks P' P² oscillate in the opposite direction, bringing the teeth on the under edge of the slot into engagement with the roller, as shown in full lines, Fig. 4.

Fig. 22 shows the bar P, the bell-crank N, and the returning-slide L in the position which they normally occupy as before the voter steps upon the platform B. Fig. 8 shows the said parts in the position which they occupy when the voter stands upon the platform and certain key-controlled mechanism, hereinafter explained, is unlocked ready for the voter to proceed with the registering of his vote. The weight of the voter throwing the bar P into the position shown in full lines in Fig. 8 and in dotted lines in Fig. 22, advances its hooked end away from the adjacent bell-crank N, but does not actuate said bell-crank in this advance movement, but only permits the movement of the bell-crank into the position shown in Fig. 8. The bell-cranks N are advanced into the position shown in Fig. 8 by means of key-controlled mechanism actuated by a key, out of the control of the voter, in the hands of the proper officers of elections. Said key-controlled mechanism, as shown in Figs. 3, 6, and 23 more particularly, consists as follows: Attached to the inner wall of the case is a plate Q, through which is journaled a disk Q', the journal Q² of which is provided with any suitable keyhole extended through to the outside of the case, as shown at $q$. This disk is constructed with outstanding lugs $q'$ $q^2$. Journaled upon the plate Q is a bell-crank Q³, provided with a hammer-arm Q⁴ and with an actuating-arm $q^3$, the latter arm being engaged by the lug $q'$ when the disk Q' is partially rotated in the proper direction. It will be seen that as the disk Q' is actuated by a key in the keyhole $q$ the lug $q'$ advances against the arm $q^3$ and trips the bell-crank Q³, causing the hammer-arm Q⁴ to strike a bell Q⁵. Upon the connecting-bar N' are a series of ratchet-teeth, as at $n'$, Fig. 22. Fulcrumed upon the plate Q is a swinging pawl N², provided with a tooth $n^2$, normally engaging the teeth $n'$ of the bar N'. The pawl N² is also provided with a spur $n^3$. When raised out of normal position, the pawl N² is held by gravity-pawl N³, engaging a notch $n^4$ in the pawl N². At the same time that the bell-crank Q³ causes the bell to sound the arm $q^3$ advancing strikes the spur $n^3$ and lifts the tooth $n^2$ of the pawl N² out of engagement with the teeth $n'$ of the bar N', allowing the bell-cranks N to be moved into position shown in Fig. 8 by means of a spring N⁴ upon one of the bell-cranks N.

Fig. 6 shows the key-controlled mechanism in normal position. Fig. 23 shows said mechanism in the positions occupied when actuated by the key.

As already described, when the voter stands upon the platform his weight advances the bar P into the position shown in dotted lines, Fig. 4, and when the key-controlled mechanism has been operated, as above set forth, the bell-crank N adjacent to the hooked end of the bar P is advanced into position shown in dotted lines, Fig. 4, in which position one of each series of sliding rods H H² may be actuated by the voter turning the desired voting-key. When the voter steps off the platform B, a spring P³ returns the bar P into normal position, thereby forcing the bell-cranks N into their primary position, carrying the returning-slide L also into normal position. The return of the slide L carries with it the rods H H², together with the voting-keys, into normal position. The key-controlled mechanism is returned into primary position by a spring Q⁶.

The shafts of the fluted rollers F F' are geared together, as shown at F² F³, Fig. 3. The shaft of one of said rollers, as of the roller F, is extended beyond said geared connection and is provided at its extremity with a pinion $f$, meshing with the teeth of the cam-slot $p^2$. As the bell-crank lever P² is manipulated in the direction of the dotted lines, Fig. 4, the upper teeth of the cam-slot will be brought into engagement with the said pinion, whereby the fluted rollers will be rotated in the direction of the arrow. Engaged with the bar P is a hammer-arm P⁴.

As shown in Figs. 3 and 4, S is a plate engaged on the inside of the case upon which the bell-cranks P' P² are fulcrumed. A gravity-pawl $s$, fulcrumed thereupon, serves to trip the hammer-arm P⁴ as the bar P retracts into normal position, thereby sounding a gong T. A spring $s'$ exerts its tension upon the hammer-arm P⁴. The plate S is provided with an elongated slot $p^3$, into which the fulcrum $p'$ projects.

R' is a pawl fulcrumed upon the lever P² to engage against a projection S⁴ on the plate S as the lever P² returns to normal position. A spring R in connection with the lever P² serves to lift the lever P² upward to engage the lower teeth of the slot $p^2$ with said pinion. The object of the pawl R' so engaging the projection S⁴ is to insure the lever P² being lifted up by the spring R when the spring is free to operate.

It will be apparent that when the lever P² has been moved into the position shown in dotted lines in Fig. 4 by the weight of the voter the pawl R' will engage the projection S⁴, which will prevent the lever P² swinging directly back in a reverse direction until it has been first lifted upward. The lever P² is provided with a spur $r$ below the pawl R', which, as the lever P² rises, will throw the pawl R' out of engagement with the projection S⁴, thereby permitting the lever P² swinging in a direction opposite that indicated by the dotted lines.

By referring to Fig. 4 it will be seen that as the lever $P^2$ is moved into the position shown in dotted lines the pivotal point of the pawl $R'$ recedes from the projection $S^4$ and also rises, as does also the spur $r$. The free end of the pawl being free to move turns on the pivot point or pin, and comes thus into contact with said spur, as indicated in dotted lines. When the lever $P^2$ is lifted, as above described, the spur being also lifted will disengage said pawl from said projection.

It is obvious that the rotation of the fluted rollers thus occasioned will carry downward any coupons that may be deposited in the voting-card passages $4^a$, thereby depositing said coupons in the drawer G therebeneath.

To lock the cover-plate $A^3$ in place, I provide a locking-bar U, (shown in Figs. 3, 5, 6, 8 and 21,) provided with a series of studs $u$, said studs arranged to engage in the fastening-piece $7^a$ of the said plates $A^3$. Each fastening-piece is constructed with a recess therein, as shown at $11^a$, with which the studs $u$ of the bar U may engage respectively.

To reciprocate the locking-bar U, I employ a bell-crank $U'$, Figs. 3 and 5, fulcrumed as at $u'$, provided with a retracting-spring $U^2$. With the bell-crank $U'$ is connected a reciprocatory hooked bar V, which is tripped by a tripping-plate W fulcrumed upon the plate Q. This tripping-plate is constructed with an arm $W'$ to engage the hooked arm of the bar V and move it in a corresponding direction to withdraw the bar U from engagement with the plates $A^3$. Another arm $W^2$ of said tripping-plate is arranged to be engaged by the lug $q^2$ as the disk $Q'$ is rotated in the direction of the arrow, Fig. 6. It will be observed that as the disk $Q'$ is thus rotated the lug $q^2$ coming into contact with the arm $W^2$ partially rotates the tripping plate W, which thereby moves the hooked bar V. The arm $W^2$ is normally out of reach of the lug $q^2$. The plate W is constructed with an elongated slot $q^4$, in which the fulcrum $w$ of the plate W projects.

X denotes a slide, one end of which extends to the outside of the register. The opposite end is held in place adjacent to the edge of the plate W, between said plate and an upturned flange $q^5$ of the plate Q.

It will be observed that when the slide X is pulled outward, its edge coming into contact with the adjacent edge of the plate W will force said plate forward, this movement being permitted by the slot $q^4$ carrying the arm $W^2$ also forward into a position where the lug $q^2$, upon the rotation of the disk $Q'$, will come into contact therewith. A spring $w'$ restores the plate W into normal position. Upon the inside of the case is a pivoted spring-latch Y, engaging in its primary position an ear $G^3$ upon the drawer G to lock the drawer in position. The plate W is provided with an additional tripping-arm $W^3$ to contact with the latch Y upon the rotation of the plate W and disengage it with the ear $G^3$, permitting the drawer to be opened. It will be seen thus that the tripping-plate W with the bell-crank $Q^3$ and their related parts are all controlled by the key inserted into the keyhole $q$.

It will be noted that the upper teeth of the slot $p^2$ of the lever $P^2$ being in contact with the pinion $f$ as the bell-crank $P^2$ is forced downward by the weight of the voter rotates the fluted rollers F and $F'$ in a corresponding manner, and that the pressure of the spring R forces the bell-crank $P^2$ upward, bringing the lower teeth of the slot $p^2$ into contact with said pinion on the reverse movement of the bell-crank $P^2$, thereby continuing the rotation of said pinion in the same direction as before, inasmuch as the teeth on the two edges of the slot engage the pinion on opposite sides upon the reverse movements of the bell-crank.

To remove the plates $A^4$ it is necessary to open the bottom $A^2$ in order that the hand may be inserted into the register to reach the thumb-screws $8^a$.

To lock the bottom $A^2$, I provide a locking mechanism (shown in Figs. 3, 6, 7, 10 and 27) consisting essentially as follows: Within the case is engaged a sliding latch $Z^4$, constructed with forks $Z^{10}$ to engage locking-lugs $Z^5$ secured upon the inner face of the bottom $A^2$, said forks embracing said lugs, as shown, for example, in Fig. 3. The bottom $A^2$ is hinged, as at $a^{14}$, Figs. 2 and 7, at one edge thereof to a fixed portion of the case. The sliding latch $Z^4$ is located adjacent to the opposite edge of the hinged bottom $A^2$, and is held in place and guided in its reciprocation by posts $A^{15}$, secured to a fixed portion of the case, the latch being provided with elongated orifices $Z^{11}$, through which the posts $A^{15}$ project, the orifices $Z^{11}$ limiting the reciprocation of the latch. The lugs $Z^5$ are constructed, as shown in Fig. 27, with a slot $Z^{12}$ to project over the adjacent portion of the sliding latch to hold the hinged bottom $A^2$ in closed position. To operate the latch $Z^4$, I provide a plate Z, secured in the fixed portion of the case adjacent to the latch $Z^4$, as indicated in plan in Fig. 3 and in section in Fig. 6. This plate Z forms the base-plate of the lock and is immovable. Through said plate passes a stem $Z'$, constructed with a head $z$ on the outer end thereof and a shank $z'$ extending into the interior of the case. The plate Z is constructed with a recessed or countersunk projection $Z^{13}$, passing through the case, the countersunk or recessed portion $z^9$ of said projection receiving the heading $z$ of said stem, the stem projecting through said plate and being rotatable therein. Within the case a disk $Z^2$ is rigidly engaged upon the inner end of said shank, so as to rotate with said stem. Said disk $Z^2$, to this end, is provided with a hub $z^2$, engaged upon the inner end of said shank. Between the plate Z and the disk $Z^2$, I locate a rotatable latch $Z^3$, provided with arms $z^3$ and $z^4$. (Clearly shown in Fig. 3.) The disk $Z^2$, rotatable with the stem $Z'$, is provided with a spur $z^5$, and the rotatable latch $Z^3$ with a shoulder $z^6$ projecting upward therefrom. The head $z$ of the stem $Z'$ is engageable by any suitable key whereby the stem may be turned, carrying the disk $Z^2$ therewith. When a key has been so applied to said stem, it will be obvious that the spur $z^5$, carried by the disk $Z^2$, will strike the shoulder $z^6$, projecting upward from the latch $Z^3$, in consequence of which, on the further rotation of the disk $Z^2$, said latch $Z^3$ will be carried therewith in a corresponding direction, thereby moving the arms $z^3$ and $z^4$ upon said rotatable latch in a corresponding manner. The sliding latch $Z^4$ is provided with a lug $Z^6$, projecting upward therefrom and against which the arm $z^3$ of the rotatable latch $Z^3$ comes in contact as the latch $Z^3$ is rotated, the spur $z^5$ having at the same time come into contact with a stud $z^7$ upon the plate Z, thereby limiting the rotation of the disk $z^2$. At the same time the arm $z^4$ is obviously carried into a position where it can be acted upon by an arm $Q^7$ on the bell-crank $Q^3$ upon the movement of said arm. The key may then be inserted to rotate the disk $Q'$, actuating the bell-crank $Q^3$, as heretofore explained, by which operation the arm $Q^7$, in contact with the arm $z^4$, will further rotate the latch $Z^3$, thereby forcing the arm $z^3$, in contact with the lug $Z^6$ on the sliding latch $Z^4$, forward, whereby said latch is forced out of engagement with the locking-lugs $Z^5$. The sliding latch $Z^4$ is further provided with an arm $Z^7$, against which the arm $z^3$ impinges, upon the reverse movement of the latch $Z^3$, to return said latch $Z^4$ to normal position, and locking the latch $Z^4$. A spring $Z^8$ returns the disk $Z^2$ and the latch $Z^3$ into normal position.

The dog $N^3$ is fulcrumed at $n^5$ and is provided with a projection $n^6$ to engage in the notch $n^4$ of the pawl $N^2$. The pawl $N^2$ is returned to normal position by means of a projection $n^7$ upon the bar $N'$ on the return of said bar, said projection $n^7$ striking against the projection $n^6$ of the dog $N^3$, forcing said dog out of engagement with the pawl $N^2$, allowing the latter pawl to drop into its primary position, its tooth $n^2$ engaging the rack $n'$, thereby holding the bar $N'$ and its related mechanism in locked position, preventing any further voting until the mechanism is again unlocked. The unlocking is thus required to be done after each voter has registered his vote in order to prevent fraud.

If it should be desired, the pawl $N^2$ might be permanently held up or removed, so that the voting could go on without unlocking the above-described mechanism for each voter, dependence being had upon the sounding of the gong every time the voter stepped off the platform, to prevent fraud.

At the closing of the polls the upper plates $A^3$ are removed in the manner specified, so that the record can be read upon the registering-wheels through the orifices in the plates $A^4$, as hereinbefore explained, while the drawer G may also be opened, as described, to count the coupons therein.

The projection $Z^{13}$ projects about the head $z$ of the stem $Z'$, and the intention is to apply sealing-wax in the recess $z^9$ thus formed, to prevent the register being opened without disturbing the seal.

The platform B is preferably made in two parts $B^2$ and $B^3$, the part $B^2$ being fixedly engaged upon an underlying floor, as by means of ears $b$, while the movable part $B^3$ is hinged thereto, as shown at $b'$, so that the part $B^3$ may be depressed by the weight of the voter and also be turned under the part $B^2$ for convenience in packing.

The operation of the device will now be understood.

The use of the platform is a most convenient way of compelling the voter to return all the keys and to sound a gong. Moreover, the use of a platform to be depressed by a heavy weight permits the use of a very strong spring $P^3$, which effectually serves to keep the keys of the register always locked when disconnected from the platform.

It will be perceived that the register will be a complete machine even if those features relating to the voting for parties not on the regular ticket were not in use.

What I claim as my invention is—

1. In a voting machine, a register having in combination a series of voting keys, a stepped plate, a series of registering wheels located upon said plate and a series of sliding rods actuated by said keys and actuating the corresponding registering wheels, said rods provided with loops $H'$, and said plate having flaps $d^3$ turned down therefrom through said loops to guide and hold said sliding rods in place, substantially as set forth.

2. In a voting machine, a register having in combination a series of voting keys each provided with a dog $c$, a stepped plate provided with openings $d^2$, a series of registering wheels supported upon said plate, and a series of sliding rods actuated by said keys, said rods provided with pawls projecting through the openings $d^2$ of the stepped plate and actuating the corresponding registering wheels, substantially as set forth.

3. In a voting machine, the combination of a stepped plate, a series of registering wheels located on the upper surface of the various steps of said plate, a series of voting keys having shanks projecting through said plate and each provided with a dog at the lower end thereof, a series of sliding rods engageable by said dogs, and a pawl carried by each of said sliding rods to actuate said registering wheels and means to lock and to release said sliding rods, substantially as set forth.

4. In a voting machine, a register having in combination a series of voting keys arranged in "party" and in "office" rows, a series of sliding rods arranged in sets corresponding to said "party rows" and actuated by said keys, a series of registering wheels arranged in sets actuated by the said rods, a sliding block having a single entrance for a set of sliding rods to receive only one sliding rod of each set at the same time, substantially as set forth.

5. In a voting machine, a register having in combination a series of voting keys, a series of sliding rods arranged in sets and actuated by said keys, and a perforated sliding block having a single entrance for a set of sliding rods to receive only one sliding rod of each set at the same time, substantially as set forth.

6. In a voting machine, a register having in combination a series of voting keys arranged in "party" and in "office" rows, a series of sliding rods arranged in sets corresponding to said "party rows" and actuated by said keys, a series of registering wheels actuated by said sliding rods a series of sliding perforated blocks each having a single entrance for a set of sliding rods and a case for said blocks whereby only one sliding rod of each set can be operated by a given voter, substantially as set forth.

7. In a voting machine, the combination of a horizontally reciprocatory drawer divided into a series of compartments, a series of vertical voting card passages leading into corresponding compartments in said drawer, rollers F F′ located at the base of said passages above the drawer, a series of voting keys provided with cover arms $c^2$ controlling said card passages, sliding rods actuated by said keys, and means of locking each of said sliding rods when it has been operated by a given voter, substantially as set forth.

8. In a voting machine, a register having in combination registering mechanism, a reciprocatory drawer provided with a lid hinged at its inner edge, voting card passages leading into said drawer, and voting keys to control said card passages, substantially as set forth.

9. In a voting machine, a register provided with a drawer divided into a series of apartments, a series of card passages leading into said apartments, a series of voting keys to control said passages, and a cover for said drawer hinged at the inner edge thereof, the rear portion of the drawer being open beneath said card passages to the rear of said cover, substantially as set forth.

10. In a voting machine, a register having in combination a series of voting keys, a series of plates $A^3$ $A^4$ arranged in pairs one above the other, supports for said plates, registering wheels actuated by said keys, lying beneath said lower plates and means to lock the lower plates from within the register, said lower plates being perforated to permit the reading of the record upon said wheels, substantially as set forth.

11. In a voting machine, the combination of a register, a series of voting keys, a series of sliding rods H actuated by said keys, locking devices to lock said rods when actuated by a given voter, a bell crank connected with the locking devices, a spring $P^3$ engaged with the bell crank to control the operation of said locking devices, and a depressible platform to receive the weight of the voter and thereby overcome the tension of said spring, said spring arranged to restore said rods to normal position when the weight of the voter is relieved from said platform, substantially as set forth.

12. In a voting machine, a register having in combination a series of sliding rods H, a series of keys to actuate said rods, a returning slide L to restore said rods to normal position, bell cranks engaged with said slide, and a reciprocatory bar P to actuate said bell cranks, substantially as set forth.

13. In a voting machine, a register having in combination a series of sliding rods, a series of keys to actuate said rods, a returning slide to restore said rods to normal position, bell cranks connected with said slide, a rack bar connecting said bell cranks, and a pawl to engage said rack bar, substantially as set forth.

14. In a voting machine, a register having in combination a series of sliding rods, a series of keys to actuate said rods, a returning slide to restore said rods to normal position, bell cranks connected with said slide, a reciprocatory bar P to actuate said bell cranks, a depressible platform and a spring actuated bell crank P′ connecting said platform and bar, substantially as set forth.

15. In a voting machine, the combination of a register provided with registering mechanism, a reciprocatory bar P to control said mechanism, bell cranks P′ P² connected with said bar, a depressible platform connected with said bell cranks to actuate said bar, and a spring to restore said bar to normal position, substantially as set forth.

16. In a voting machine, the combination of a register provided with registering mechanism, a reciprocatory bar P to control said mechanism, bell cranks P′, P² connected with said bar, a depressible platform connected with said bell cranks to actuate said bar, and a spring to restore said bar to normal position, and a gong arranged to be sounded by the reciprocation of said bar, substantially as set forth.

17. In a voting machine, a register having in combination a series of sliding key actuated rods, a returning slide L to restore said rods to normal position, bell cranks connected with said returning slide, a toothed bar N′ connecting said bell cranks, a pawl N² to engage said toothed bar, means to lock said pawl in engagement with said bar, and to release the pawl therefrom, substantially as set forth.

18. In a voting machine, a register having in combination plates $A^3$, each provided with a recessed fastening piece 7ª, a locking bar U provided with a series of studs $u$ to engage said fastening pieces, a hooked bar V connected with said locking bar, an oscillatory tripping plate W provided with an arm W' to actuate said hooked bar, and a key actuated disk Q' to actuate said tripping plate, substantially as set forth.

19. In a voting machine, a register having in combination a removable bottom $A^2$, a sliding latch $Z^4$ to lock said bottom, key actuating mechanism to operate the latch, said key actuating mechanism adapted to receive a seal, substantially as set forth.

20. In a voting machine, a register having in combination fluted rollers F, F' geared together, a bell crank $P^2$ provided with a toothed slot $p^2$ engaging one of said rollers to rotate said rollers, and a depressible platform engaged with said bell crank, substantially as set forth.

21. In a voting machine, a register having in combination fluted rollers F, F' geared together, an adjustable bell crank $P^2$ provided with a slot $p^2$ toothed on its upper and lower edges engaging one of said rollers to rotate said rollers, a depressible platform to actuate said bell crank in one direction, and a spring $P^3$ to lift the bell crank and restore it to normal position when the strain of said platform is relieved therefrom, substantially as set forth.

In testimony whereof I sign this specification in the presence of two witnesses.

FRANK H. GILBERT.

Witnesses:
GEORGE F. LOEB,
S. P. MACKEY.